United States Patent [19]
Hunter et al.

[11] Patent Number: 5,601,408
[45] Date of Patent: Feb. 11, 1997

[54] AXISYMMETRIC ELASTOMERIC BEARING ASSEMBLY FOR HELICOPTER ROTORS

[75] Inventors: David H. Hunter, Cheshire, Conn.;
Francis E. Byrnes, White Plains, N.Y.;
Douglas E. Tritsch, Beavercreek, Ohio

[73] Assignee: Sikorsky Aircraft Corporation, Stratford, Conn.

[21] Appl. No.: 617,458

[22] Filed: Mar. 18, 1996

[51] Int. Cl.$^6$ ................................................ B64C 27/35
[52] U.S. Cl. ........................................ 416/134 A; 267/141.1
[58] Field of Search .......................... 416/134 A, 140, 416/141; 267/141.1, 141.7, 294; 384/221

[56] References Cited

U.S. PATENT DOCUMENTS

| | | | |
|---|---|---|---|
| 3,282,350 | 11/1966 | Kisovec | 416/134 A |
| 3,761,199 | 9/1973 | Ferris et al. | |
| 3,862,812 | 1/1975 | Gorndt et al. | 416/141 |
| 3,932,059 | 1/1976 | Rybicki | |
| 4,235,570 | 11/1980 | Ferris et al. | |
| 4,297,078 | 10/1981 | Martin | 416/134 A |
| 4,568,245 | 2/1986 | Hibyan et al. | |
| 4,588,356 | 5/1986 | Pariani | 416/134 A |
| 4,797,064 | 1/1989 | Ferris et al. | |
| 4,895,354 | 1/1990 | Byrnes | |
| 4,930,983 | 6/1990 | Byrnes et al. | |
| 5,031,545 | 7/1991 | Bourgeot | 267/141.1 |
| 5,110,259 | 5/1992 | Robinson | 416/134 A |
| 5,120,195 | 6/1992 | Schmaling et al. | |

Primary Examiner—James Larson
Attorney, Agent, or Firm—Brian A. Collins

[57] ABSTRACT

An axisymmetric elastomeric bearing assembly (30) for an articulated rotor hub assembly (10), which axisymmetric elastomeric bearing assembly (30) is disposed in combination with a rotor assembly yoke (24) and hub retention member (12) of the rotor hub assembly (10) and is operative for accommodating the multi-directional displacement of a rotor blade assembly (14) thereof. The axisymmetric elastomeric bearing assembly (30) includes a central bearing element (32) having a spherical bearing surface (32s) defining a bearing focal point (30f) and spherical elastomeric elements (34) bonded to the spherical bearing surface (32s) on opposing sides of the bearing focal point (30f). Each of the spherical elastomeric elements (34) have a plurality of alternating layers of elastomer and nonresilient shims (36, 38) which have a center of curvature which is coincident with the bearing focal point (30f) and disposed at increasing radii therefrom. Bearing endplates (40) are bonded to the spherical elastomeric elements (34) and are mounted in combination with the yoke (24) and hub retention member (12). In operation, the central bearing element (32) is rotationally self-positioning to effect load and motion sharing between the spherical elastomeric elements (34).

6 Claims, 7 Drawing Sheets

AXISYMMETRIC ELASTOMERIC BEARING ASSEMBLY FOR HELICOPTER ROTORS

TECHNICAL FIELD

This invention is directed to elastomeric bearings, and, more particularly, to elastomeric bearings for articulated helicopter rotor hubs, and more particularly, to an axisymmetric elastomeric bearing assembly for accommodating the multi-directional displacement of the rotor blade assemblies of such rotor hubs.

BACKGROUND OF THE INVENTION

A helicopter rotor hub is the primary structural assembly for driving torque to and reacting the centrifugal loads of each rotor blade and transferring lift loads thereof to the aircraft fuselage. Common varieties of rotor hubs include articulated, hingeless and bearingless types wherein the rotor hub is characterized by the specific means for accommodating the multi-directional displacement of the rotor blades. For example, articulated rotor hubs typically employ one or more bearing elements to accommodate rotor blade excursions whereas bearingless rotor hubs utilize flexible structures, commonly termed "flexbeams", to functionally replace the bearing elements of articulated rotor hubs.

Within the class or category of articulated rotors are those which include a central hub member for driving a plurality of rotor blade assemblies via spherical multi-laminate elastomeric bearings. More specifically, the hub member includes a plurality of radial spokes and shear segments which structurally interconnect a pair of radial spokes. Each shear segment, in combination with its respective pair of spokes, form a structural loop which, depending upon the configuration of the hub member, may be vertically or horizontally oriented. Each structural loop accepts a rotor assembly yoke which is generally C-shaped and circumscribes, in looped fashion, the shear segments of the hub member. The rotor assembly yoke includes a midsection, which extends though the respective structural loop, and a pair of radial arms which are disposed on either side of the shear segment. The proximal ends of the yoke arms mount to the root end of the respective rotor blade or, alternatively, to an intermediate cuff structure. A spherical elastomeric bearing comprised of alternating layers of elastomer and nonresilient shims is interposed between the midsection of each yoke and the shear segment to accommodate the loads and motions of the respective rotor blade.

Centrifugal forces are transferred to the hub member as a compressive load in the elastomeric bearing, i.e., as the yoke bears against the innermost bearing endplate of the elastomeric bearing. The spherical configuration of the elastomeric bearing accommodates the transmission of torque to the rotor blade, provides for the transmission of lift loads to the rotor hub and, accommodates the in-plane (edgewise), out-of-plane (flapwise) and pitch change (feathering) motion of the rotor blade. U.S. Pat. Nos. 3,761,199, 4,235,570, 4,568,245, 4,797,064, and 4,930,983 illustrate articulated rotors of the type described above and are generally indicative of the current state-of-the art.

Aside from the loading requirements, the size of the rotor hub assembly, e.g., the spatial separation between the spokes of the hub member and radial arms of the yoke, is determined by the operational motion envelop of the rotor system in combination with the envelop of the elastomeric bearing. That is, the flapwise, edgewise and pitch motion of the rotor system dictates the clearance requirements, e.g., between the yoke and hub member, while the size of the elastomeric bearing influences the requisite geometry of the yoke and hub member. For example, adequate clearance must be provided between the radial arms of the yoke and the radial spokes and/or respective shear segments of the rotor hub to avoid interference therebetween as the rotor assembly yoke displaces due to blade excursions. Furthermore, the adjacent yokes and/or a yoke and an intervening rotor blade damper, must be sufficiently spaced-apart to accommodate such yoke displacement.

With respect to the elastomeric bearing, several factors determine the construction and geometry, e.g., min and max transverse diameter, cone angle and thickness, of the elastomeric laminates employed therein. Firstly, the desired fatigue life of the elastomeric bearing must be established to determine the requisite properties, e.g., durometer, shear modulus, shear allowable, etc., of the elastomeric laminates. Secondly, the centrifugally induced compressive forces are considered for determining the minimum transverse diameter and inner radius of the elastomeric laminates. That is, a minimum pressure area, transverse to the direction of centrifugal loading, is required to react the centrifugal load acting on the elastomeric laminates. Thirdly, transverse loading, such as those imposed by torque or lift loads, in combination with centrifugal loads, are considered for determining the cone angle and, consequently, the maximum transverse diameter of the elastomeric laminates. That is, a minimum support cone is required to provide buckling stability when transverse loads are applied to the elastomeric bearing or when centrifugal loads, in combination with transverse displacement, are applied thereto. Lastly, and perhaps, most importantly, the anticipated displacement due to flapping and pitch change motion must be maintained below the shear strain allowable of the elastomer layers to prevent premature failure and ensure adequate service life of the bearing assembly. Insofar as the shear displacement of each layer of elastomer is limited by its shear allowable, the total displacement must be accommodated by a plurality of laminates in series. Accordingly, the total thickness of the elastomeric bearing is a function of the flap and pitch motion requirements. These design criteria will be discussed in greater detail hereinafter.

It will be appreciated that the various criteria set forth above are interrelated and must be interatively examined to ensure that all criteria are satisfied. For example, the thickness of the elastomeric bearing, which is predominately determined by the flap and pitch motion requirements, influences the maximum transverse diameter of the bearing. That is, as the bearing thickness increases, the support cone must similarly increase to maintain the necessary transverse and flapwise stiffness. Consequently, the transverse diameter of the bearing must increase to span the distance defined by the support cone.

In meeting the above-described criteria, the transverse diameter and focal distance of the prior art elastomeric bearing present obstacles which limit the available options for the rotor hub designer. For example, as the transverse diameter increases, the distance between the radial spokes of the rotor hub and radial arms of the yoke must increase to accommodate the envelop of the elastomeric bearing. The necessity to enlarge the hub and/or yoke adversely impacts the weight and aerodynamic drag characteristics of the rotor system. Similar weight and drag penalties are incurred as the thickness of the elastomeric bearing is caused to increase due to the motion requirements. More specifically, as the thickness increases, the distance from the bearing focal point to the shear segment of the rotor hub increases. It will be appreciated that as this dimension (referred to as the "focal distance") is caused to increase, a larger clearance dimension is required between the yoke and respective shear segment to accommodate the same motion requirements. Consequently, the yoke and/or radial spokes must be enlarged, yet further, to accommodate the increased spatial requirements.

The size of the elastomeric bearing also effects the ability to orient the radial arms of the yoke in a horizontal plane. Such orientation is desirable to minimize aerodynamic drag in regions of high rotational velocity airflow (a function of the distance from the rotational axis of the rotor hub assembly) and to facilitate attachment of pitch control rods which provide pitch input to the rotor blades via the rotor assembly yoke. It will be appreciated that as the yoke assemblies are enlarged to accommodate the size of the bearing, less clearance is available between adjacent yokes or between a yoke and an intervening rotor blade damper.

A need therefore exists to provide an elastomeric bearing assembly for a helicopter rotor hub which is capable of accommodating the loads and motions thereof while minimizing the envelop of the elastomeric bearing, and particularly, the transverse diameter and focal distance thereof.

SUMMARY OF THE INVENTION

It is an object of the present invention to provide an axisymmetric elastomeric bearing for use in combination with an articulated rotor hub assembly and operative for accommodating the multi-directional displacement of the rotor blades thereof wherein the maximum transverse diameter and focal distance of the elastomeric bearing is minimized for reducing the size and weight of the rotor hub assembly.

It is another object of the invention to provide such an elastomeric bearing which accommodates large rotor blade excursions while minimizing the shear strain in the elastomeric laminates.

It is yet another object of the present invention to provide such an elastomeric bearing which maintains a sufficient support cone for providing the requisite buckling stability.

It is yet a further object of the invention to provide such an elastomeric bearing which facilitates orientation of the rotor assembly yoke in a substantially horizontal plane.

These and other objects of the invention are achieved by an axisymmetric elastomeric bearing assembly for an articulated rotor hub assembly, which axisymmetric elastomeric bearing assembly is disposed in combination with a yoke and hub retention member of the rotor hub assembly and is operative for accommodating the multi-directional displacement of a rotor blade assembly thereof. The axisymmetric elastomeric bearing assembly includes a central bearing element having a spherical bearing surface defining a bearing focal point and spherical elastomeric elements bonded to the spherical bearing surface on opposing sides of the bearing focal point. Each of the spherical elastomeric elements have a plurality of alternating layers of elastomer and nonresilient shims which have a center of curvature which is coincident with the bearing focal point and disposed at increasing radii therefrom. Bearing endplates are bonded to the spherical elastomeric elements and are mounted in combination with the yoke and hub retention member. In operation, the central bearing element is rotationally self-positioning to effect load and motion sharing between the spherical elastomeric elements.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

Figure 1:
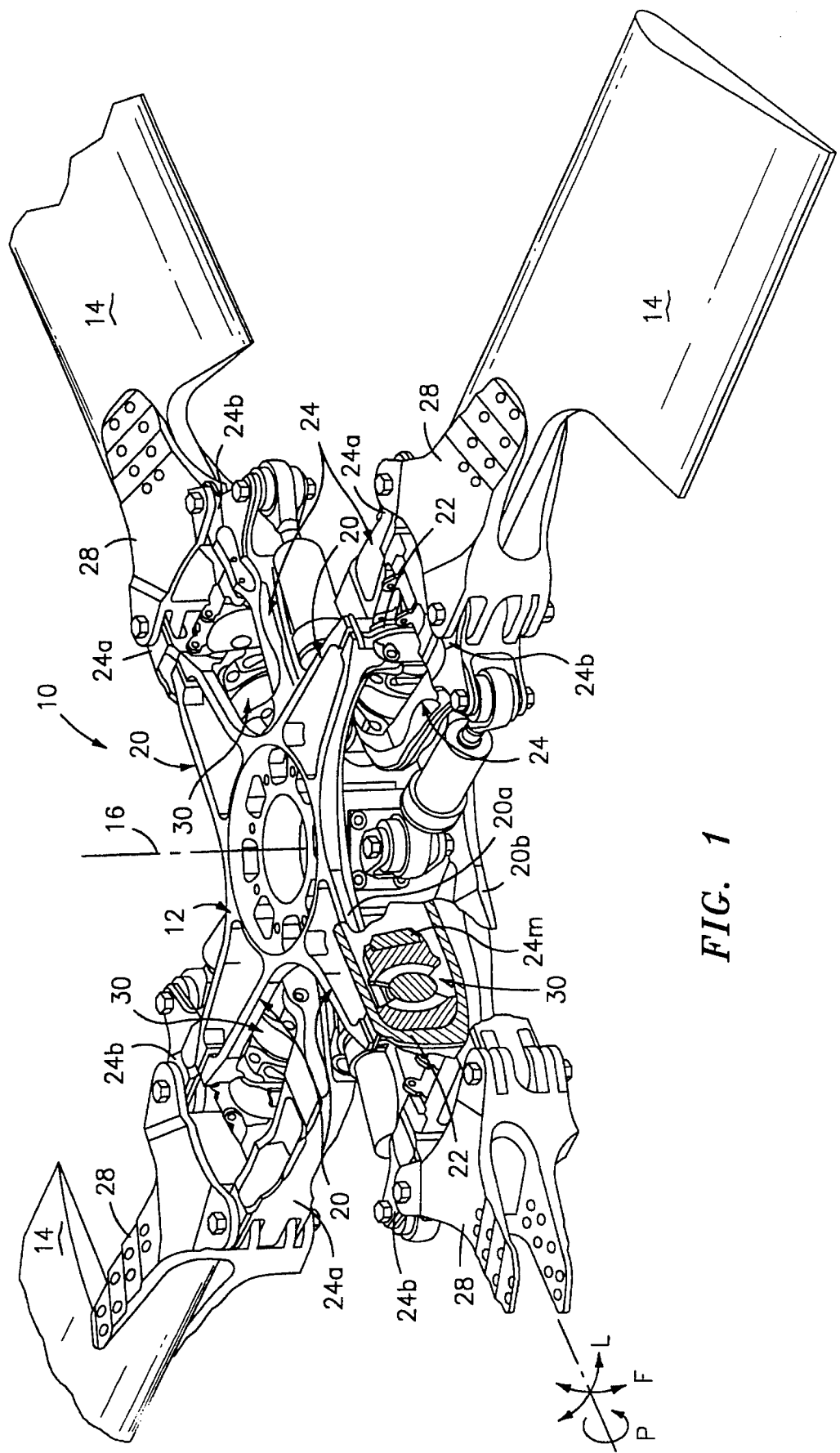
FIG. 1 depicts a perspective view of an articulated rotor hub assembly wherein a portion of the rotor hub assembly is broken-away to reveal the axisymmetric elastomeric bearing assembly according to the present invention.

Referring now to the drawings wherein like reference characters identify corresponding or similar elements throughout the several views, FIG. 1 depicts an articulated rotor hub assembly 10 including a hub retention member 12 operative for driving a plurality of rotor blade assemblies 14 about an axis of rotation 16. The hub retention member 12 includes a plurality of radial spokes 20 and shear segments 22 which structurally interconnect pairs of radial spokes, i.e., upper and lower radial spokes, 20a, and 20b, respectively. Each shear segment 22, in combination with its respective radial spokes 20, form a structural loop for accepting a rotor assembly yoke 24. The yoke 24 is generally C-shaped and circumscribes, in looped fashion, the respective shear segment 22. More specifically, the yoke 24 includes a midsection 24m, which extends through the respective structural loop, and a pair of radial arms 24a, 24b which project outwardly of the midsection 24m and to either side of the shear segments 22. The proximal ends of each radial arm 24a, 24b are disposed in combination with cuff structures 28 which, in turn, mount to the root end of each rotor blade assembly 14.

An axisymmetric elastomeric bearing assembly 30 according to the present invention is interposed between each rotor assembly yoke 24 and the respective shear segment 22 to accommodate the multi-directional displacement of the rotor blade assembly 14. More specifically, the inventive axisymmetric elastomeric bearing assembly 30 is operative for accommodating flapwise, lead-lag (edgewise), and pitch motion of the respective blade assembly 14, indicated by arrows F, L and P, respectively, while furthermore, driving torque to the respective rotor blade assembly 14, transferring lift loads thereof to the hub retention member 12 and reacting centrifugal loads acting on the rotor blade assembly 14. Insofar as each axisymmetric elastomeric bearing 30, respective yoke 24 and shear segment 22 are essentially identical for mounting each rotor blade assembly 14, it will facilitate the discussion to describe a single axisymmetric elastomeric bearing assembly 30 and its interaction with the respective hub assembly components.

Figure 2A:
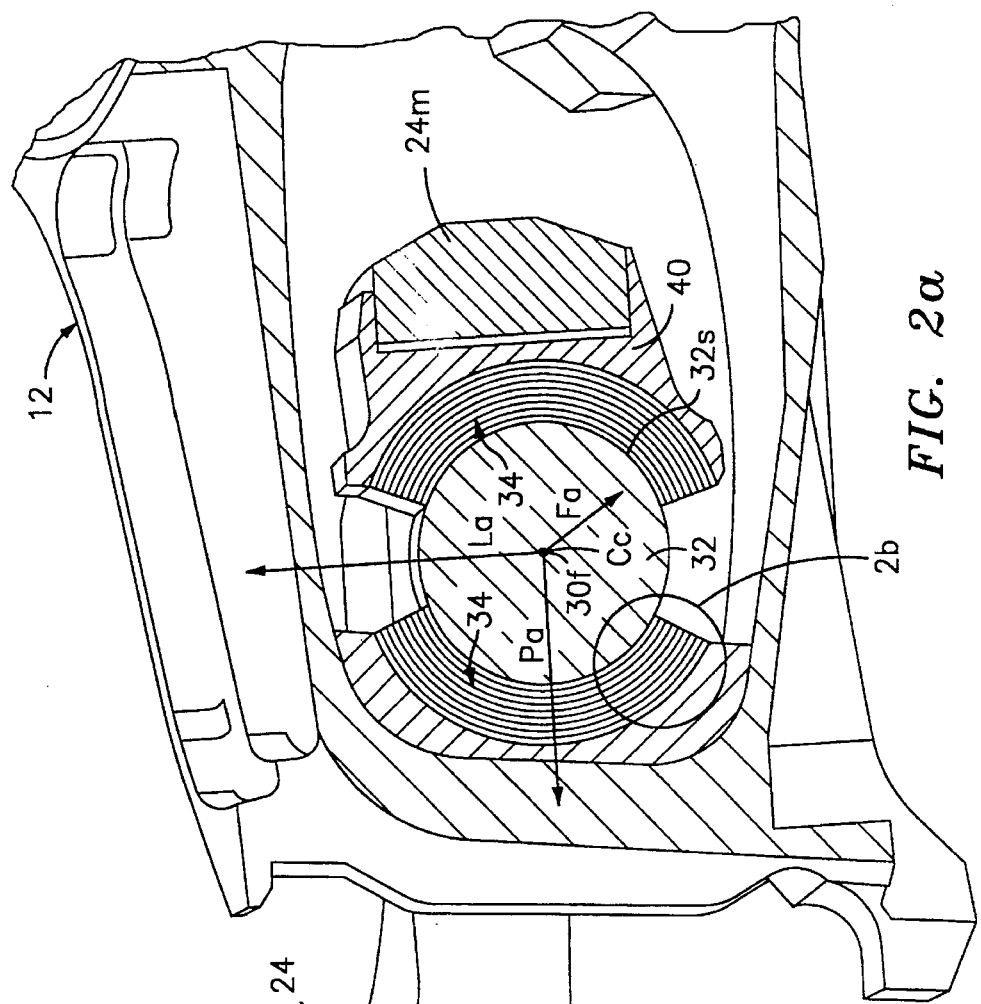
FIG. 2a depicts an enlarged broken-away perspective view of the axisymmetric elastomeric bearing assembly in combination with a rotor assembly yoke and a shear segment of the rotor hub assembly.
Figure 2B:
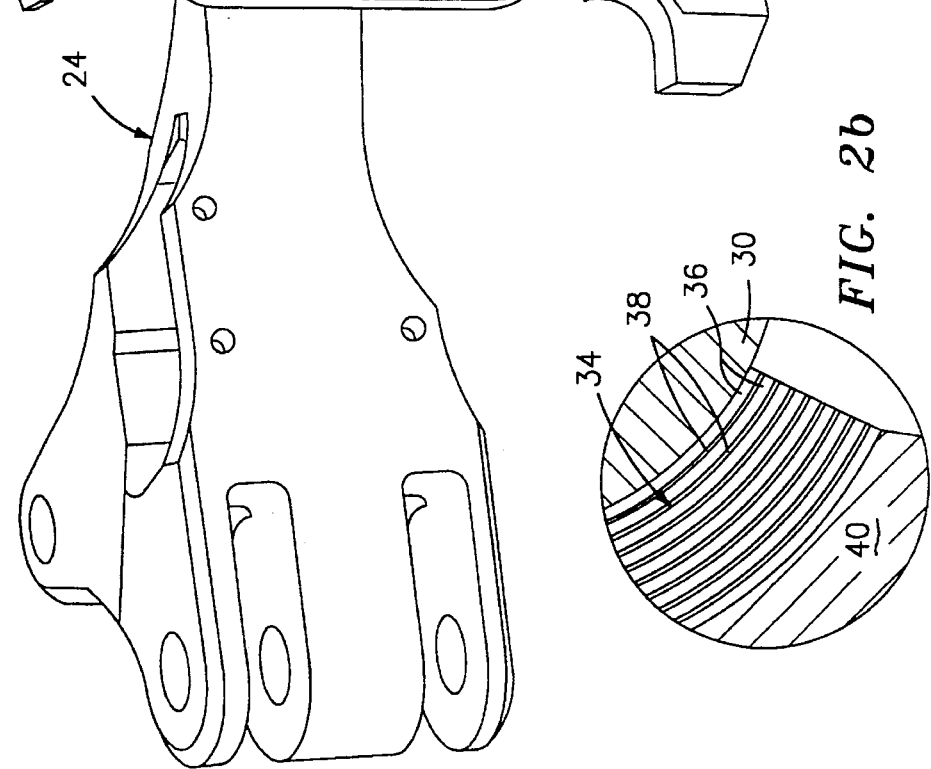
FIG. 2b depicts an enlarged view of the elastomeric laminates of the axisymmetric elastomeric bearing assembly.

In FIG. 2, the axisymmetric elastomeric bearings 30 is shown in combination with a rotor assembly yoke 24 and a respective shear segment 22. The axisymmetric elastomeric bearing 30 includes a central bearing element 32 having a spherical bearing surface 32s which defines a bearing focal point 30f. The bearing focal point 30f defines the flap, lead-lag and pitch axes, Fa, La, and Pa, respectively, about which the rotor blade assembly articulates. To the spherical surface 32s is bonded discrete spherical elastomeric elements 34 which are disposed on opposing sides of the bearing focal point 30f. Furthermore, each spherical elastomeric element 34 is comprised of a plurality of alternating layers (see FIG. 2b) of elastomer and nonresilient shims 36 and 38, respectively, which are disposed at increasing radii from the bearing focal point 30f and have a center of curvature $C_c$ which is coincident therewith. Bearing endplates 40 are bonded to the outermost elastomer layers 36 of the spherical elastomeric elements 34 and are suitably configured for being disposed in combination the rotor assembly yoke 24 and the shear segment 22. More specifically, the radially innermost bearing endplate 40 is disposed in combination with the midsection 24m of the rotor assembly yoke 24 and the radially outermost bearing endplate 40 is disposed in combination with the shear segment 22 of the hub retention member 12.

Figure 3:
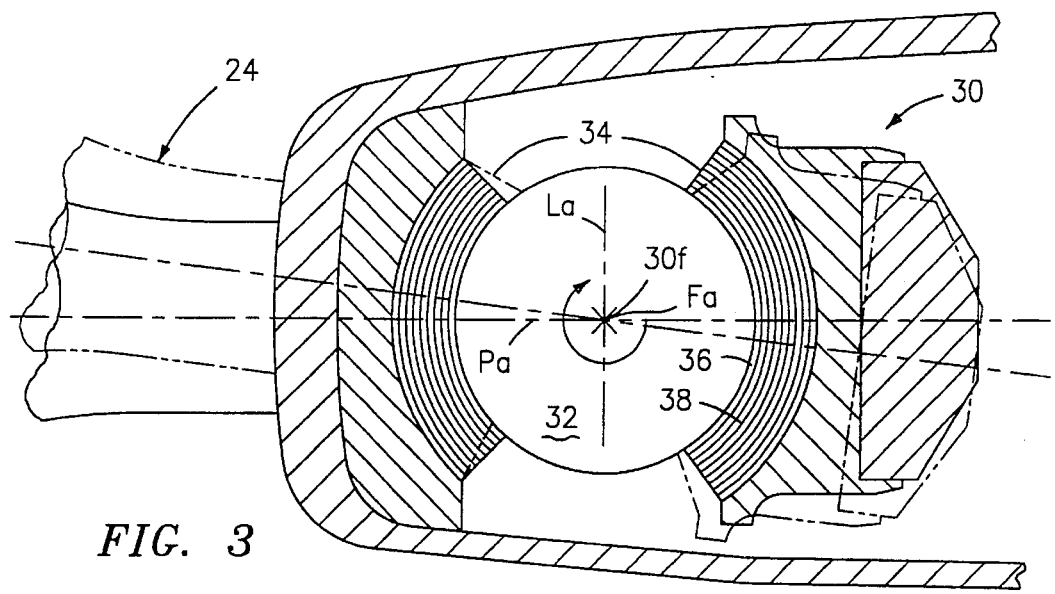
FIG. 3 depicts a side plan view of FIG. 2 wherein the axisymmetric elastomeric bearing assembly has been displaced about its focal point in response to blade induced loads and motions.

In FIG. 3, the axisymmetric elastomeric bearing assembly 30 is shown in a displaced condition under the influence of rotor blade induced loads and motions. More specifically, the rotor assembly yoke 24 is shown in a highly displaced angular position under the influence of flapwise induced blade excursions. As the rotor assembly yoke 24 is displaced under load, the spherical elastomeric elements 34 are caused to displace about the bearing focal point 30f through shear displacement of each elastomer layer. Concurrently, the central bearing element 32 rotates such that loads and motions are shared between the spherical elastomeric elements 34. That is, the central bearing element 32 is rotationally self-positioning about the flap axis, Fa, such that the corresponding elastomeric layers 36, 38 of the spherical elastomeric elements 34, i.e., the layers 36, 38 disposed an equal radii from the bearing focal point 30f, experience substantially the same compressive loads and shear strain. While the condition depicted illustrates rotation of the central bearing element 32 about the flap axis, Fa, it will be appreciated that the central bearing element 32 is free to rotate about all axes, i.e., flap, lead-lag and pitch axes, Fa, La, Pa, thereby effecting load and motion sharing through the full range of rotor blade excursions.

Figure 4:
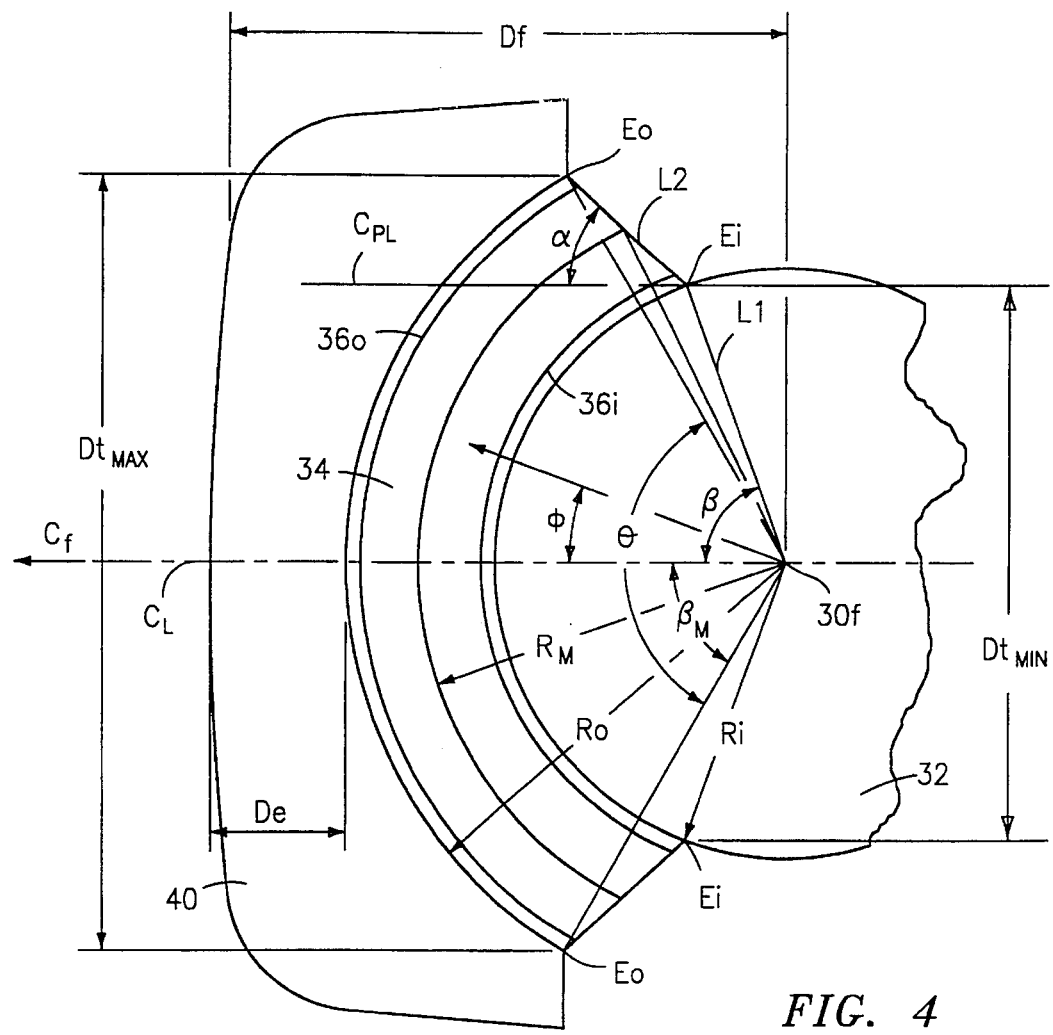
FIG. 4 depicts a schematic view of one of the spherical elastomeric elements of the axisymmetric elastomeric bearing and the relevant geometric characteristics thereof.

The axisymmetric elastomeric bearing assembly 30 of the present invention reduces the motion induced shear strain of the spherical elastomeric elements 34 which, consequently, permits a reduction in the maximum transverse diameter and focal distance of the bearing assembly 30. To acquire a better appreciation of these and other features of the present invention, reference is made to FIG. 4 which identify the critical dimensions and geometry of the axisymmetric elastomeric bearing 30. Before discussing the geometric relationships, the following dimensions and geometric symbols are identified. The centerline $C_L$ is a line which passes through the center of the spherical elastomeric elements 34 and intersects the bearing focal point 30f. The radii Ri and Ro are the radius dimensions of the innermost and outermost elastomer layers 36i, 36o of the spherical elastomeric elements 34, respectively. An angle $\beta$ is defined by the centerline $C_L$ and a first line L1 which intersects the bearing focal point 30f and a free edge Ei of the innermost elastomer layer 36. An angle $\alpha$ is defined by a line $C_{PL}$ parallel to the centerline $C_L$ and a second line L2 which intersects the free edges Ei and Eo of the innermost and outermost elastomer layers 36i, 36o. Angle $\theta$ is the support cone angle defined by the radius Ro and angles $\beta$ and $\alpha$. The minimum transverse diameter $Dt_{MIN}$ is the transverse dimension, i.e., transversely of the centerline $C_L$, of the innermost elastomer layer 36. The maximum transverse diameter $Dt_{MAX}$ is the transverse dimension of the outermost elastomer layer 36 and, furthermore, spans the arc defined by the cone angle $\theta$. And, the focal distance Df is the distance along the centerline $C_L$ from the bearing focal point 30f to the end of the outermost bearing endplate 40.

It will be appreciated that the maximum transverse diameter $Dt_{MAX}$ and focal distance Df is a function of the radius Ro to the outermost elastomer layer 36o. Furthermore, the maximum transverse diameter $Dt_{MAX}$ must span a transverse distance defined by the support cone angle $\theta$ for providing the requisite buckling stability. With regard to the latter, buckling stability is particularly critical for the axisymmetric elastomeric bearing assembly 30 insofar as the central bearing element 32 is restrained only by the spherical elastomeric elements 34. Consequently, the transverse and flapwise stiffness thereof must be carefully analyzed to prevent buckling instability, i.e., to maintain the position of the central bearing element 32. These issues will be discussed in greater detail below.

As mentioned earlier, the facility for the central bearing element 32 to rotate freely between the spherical elastomeric elements 34 effects motion sharing therebetween. Consequently, each of the spherical elastomeric elements 34 accommodates ½ of the total angular displacement induced by blade excursions. Such reduced angular displacement reduces the shear strain in the elastomeric elements 34 and particularly, the shear strain in the outermost elastomer layer 36o. Accordingly, the axisymmetric elastomeric bearing assembly 30 requires fewer elastomer layers 36, per spherical elastomeric element, than that required by a non-symmetric spherical elastomeric bearing of the prior art. By reducing the number of elastomer layers 36, the radius dimension Ro is minimized and, consequently, the maximum transverse diameter $Dt_{MAX}$ required to span a given support cone angle $\theta$ may be reduced. Similarly, a reduction in the radius dimension Ro permits a reduction in the focal distance Df of the axisymmetric elastomeric bearing assembly 30. That is, insofar as the focal distance Df is equal to the sum Ro+De, it will be apparent that variations in Ro will increase or decrease the focal distance of the bearing assembly 30.

The requisite support cone angle θ, is primarily determined by the loading conditions, the mechanical properties of the elastomeric layers, e.g., the bulk and shear modulus of the elastomer, strain allowables of the elastomer and non-resilient shims, etc., the radii Ri, Ro to the innermost and outermost elastomer layers 36i, 36o and key geometric angles β and α. More specifically, the support cone angle θ may be determined by an iterative process which compares a calculated buckling strength to a required buckling strength. Expressions 1.0 and 2.0 below must be satisfied to ensure adequate buckling stability.

$$\text{Buckling Strength} \cong \sqrt{2/2} \; [K_T + ((K_T + 16\pi K_T K_F)/(Ro - Ri)^2)^{1/2}] \quad (1.0)$$

wherein $K_T$ and $K_F$ are the transverse and flapwise stiffness, respectively, of the bearing assembly 30 for a given bearing geometry, and $$\text{Buckling Strength} \geq C_f * SF \quad (2.0)$$

wherein $C_f$ is the anticipated centrifugal force acting on the bearing assembly 30, and SF is the desired factor of safety.

The values of transverse and flapwise stiffness $K_T$, $K_F$ may be determined by various methods known in the art, however, in a simplified analysis:

$$K_T \cong R_M^3 \text{ and} \quad (3.0)$$

$$K_F \cong R_M^4 \quad (4.0)$$

$$R_M = (Ri + Ro)/2 \quad (5.0)$$

wherein $R_M$ is the mean radius of a spherical elastomeric element 34.

The values Ri and Ro are determined by an iterative process based on the loading conditions, motion requirements, and the compressive strength and shear strain allowables of the elastomer layers 36. The inner radius Ri is primary determined by the centrifugal force $C_f$ acting on the bearing assembly 30, the profile area of the elastomer $\pi(Ri \sin \beta)^2$, and the compressive strength allowable of the innermost elastomer layer 36i. The governing equation for calculating a minimum Ri is as follows.

$$Ri \geq \sqrt{C_f / \pi \sin \beta^2 \delta_{Allow}} \quad (6.0)$$

wherein $\delta_{Allow}$ is the compressive strength allowable of the elastomer material, and wherein the angle β is between about 65 degrees to about 85 degrees, and, preferably, is between about 70 degrees to about 80. The foregoing ranges for angle β have been determined by the inventors to be optimum for such axisymmetric bearing assembly 30 insofar as angles above 85 degrees interfere with manufacturing processes i.e., interfere with the ability to form the elastomeric elements 34, while angles below 65 degrees increase the mean radius $R_M$ and, consequently, decrease the buckling strength.

To determine Ro and a value $\beta_M$ indicative of the mean angle β to the elastomer layer corresponding to the mean radius $R_M$, the following equations 7.0 and 8.0 are solved simultaneously:

$$\gamma_{ALLOW} \cong ((Ro + Ri)/2)) \sin \beta_M \phi / (Ro - Ri) \quad (7.0)$$

wherein $\gamma_{ALLOW}$ is the shear strain allowable of the elastomer, and φ is the maximum anticipated flap angle of the rotor blade assembly 14 or, alternatively, any angle though which maximum excursions are anticipated, and $$\beta_M \cong \alpha + \sin^{-1}((2Ri/Ro + Ri) \sin \beta - \alpha) \quad (8.0)$$

wherein α is between about 35 degrees to about 55 degrees and, preferably, about 40 degrees to about 50 degrees. The foregoing ranges for angle α have been determined by the inventors to be optimum for such axisymmetric bearing assembly 30 insofar as angles above 55 degrees increase the mean angle $\beta_M$ such that Ro must increase to meet the strain allowable requirements while angles below 35 degrees increase the mean radius $R_M$ such that buckling strength is reduced.

Having determined a Ro and a minimum value for Ri, the mean radius $R_M$ is calculated by equation 5.0 and the transverse and flapwise stiffness values $K_T$, $K_F$ are determined by equations 3.0 and 4.0, respectively, which stiffness values are used to satisfy the buckling strength criteria of equations 1.0 and 2.0.

While many geometric and material combinations may be employed to achieve the necessary buckling stability while satisfying the motion requirements of such helicopter rotors, the Table below outlines the parameters of an exemplary axisymmetric elastomeric bearing assembly 30. The axisymmetric elastomeric bearing assembly 30 is sized for a rotor system wherein each blade assembly 14 experiences maximum flapwise excursions of about ±15 degrees and maximum pitch excursions of about ±30 degrees. Furthermore, the centrifugal load $C_f$ acting on each blade assembly is about 71,000 lbs (15962N), and a safety factor of 2.5 is used for ensuring adequate buckling stability.

TABLE

| | |
|---|---|
| Angle α | 45 degrees (.79 radians) |
| Angle β | 75 degrees (1.31 radians) |
| Angle $\beta_M$ | 71.5 degrees (1.25 radians) |
| Cone Angle θ | 136 degrees (2.37 radians) |
| Radius Ri | 2.10 inches (5.33 cm) |
| Radius Ro | 3.20 inches (8.13 cm) |
| Transverse Diameter $Dt_{MAX}$ | 5.75 inches (14.61 cm) |
| Focal Distance Df | 3.50 inches (8.89 cm) |
| Material Composition of: | |
| Elastomer Layers | 15% Natural Rubber, 85% Polybuteldyne |
| Non-Resilient Shims | Stainless Steel |
| Average Bulk Modulus of: | |
| Elastomer Layers | 200,000 lbs/in² (1.3 × 10⁹ N/m²) |
| Non-resilient Shims | 23,000,000 lbs/in² (1.6 × 10¹¹ N/m²) |
| Average Shear Modulus of: | |
| Elastomer Layers | 180 lbs/in² (1.24 × 10⁶ N/m²) |
| Non-resilient Shims | 10,000,000 lbs/in² (6.9 × 10¹⁰ N/m²) |
| Total Number of: | |
| Elastomer Layers | 9 |
| Non-Resilient Shims | 8 |
| Average Thickness of: | |
| Elastomer Layers | .1 inches (.254 cm) |
| Non-Resilient Shims | .04 inches (.102 cm) |
| Average Shear Strain Allowable of: | |
| Elastomer Layers | .35 in/in (.35 cm/cm) |
| Non-Resilient Shims | .0012 in/in (.0012 cm/cm) |
| Average Compressive Strain Allowable of: | |
| Elastomer Layers | .05 in/in (.05 cm/cm) |
| Non-resilient Shims | .0025 in/in (.0025 cm/cm) |

Figure 5A:
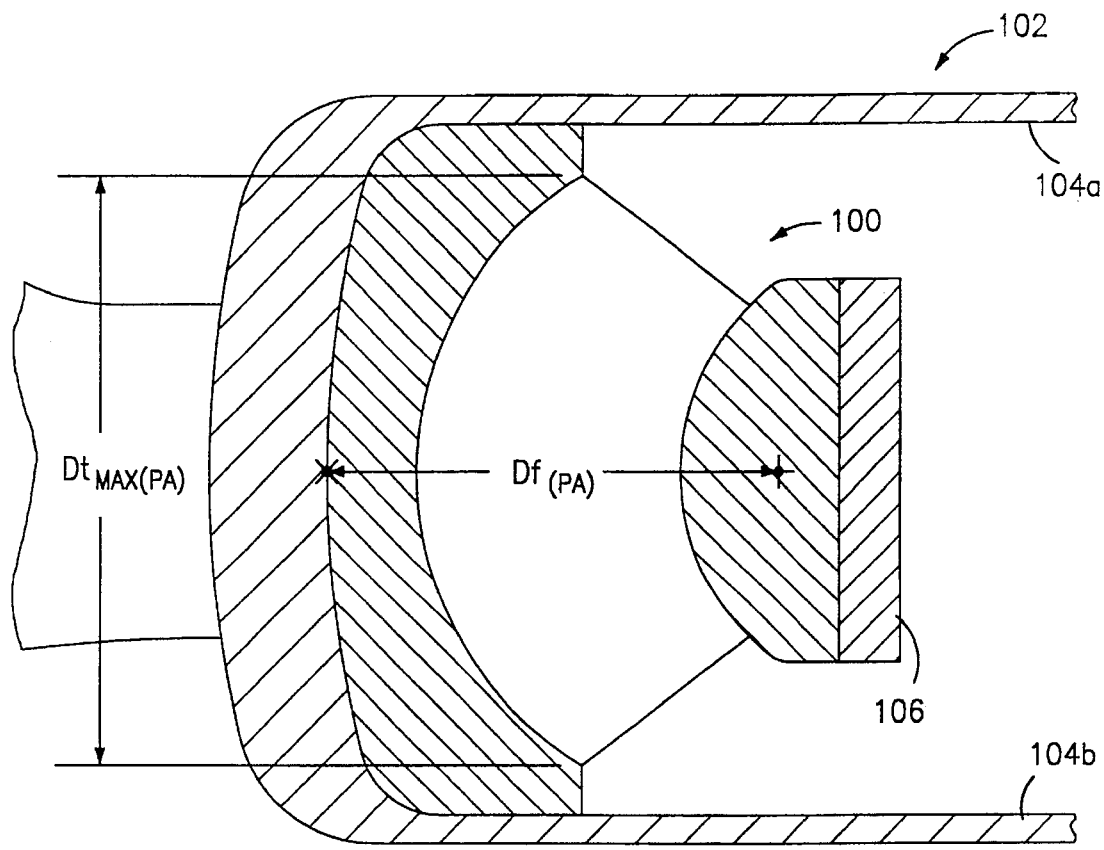
FIGS. 5a and 5b depict side schematic views of a prior art elastomeric bearing and the axisymmetric elastomeric bearing assembly, respectively, for the purpose of comparing dimensional variations therebetween.
Figure 5B:
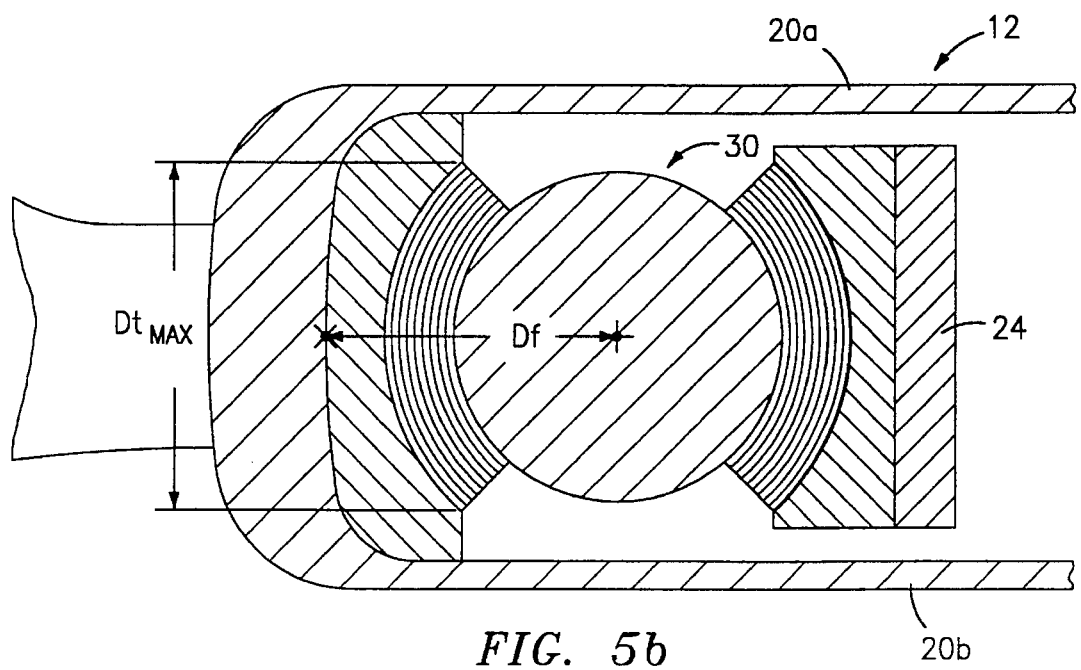

FIGS. 5a and 5b show side views of a prior art non-symmetric elastomeric bearing 100 and the axisymmetric elastomeric bearing assembly 30, respectively, for comparing the transverse diameters and focal distances of the bearing assemblies 100, 30. By examination thereof, it will be appreciated that the maximum transverse diameter $Dt_{Max(PA)}$ and focal distance $Df_{(PA)}$ of the prior art bearing assembly 100 is appreciably larger than the maximum transverse diameter $Dt_{Max}$ and focal distance Df of the axisymmetric elastomeric bearing assembly 30 of the present invention. Consequently, the hub retention member 102, i.e., the radial spokes 104a and 104b must be suitably configured (enlarged) to accommodate the envelop defined by the prior art elastomeric bearing 100. As discussed in the Background of the Invention, such enlarged envelop adversely impacts the weight and aerodynamic drag of the rotor hub assembly. In contrast, the axisymmetric elastomeric bearing assembly 30 minimizes the vertical spacing between the radial spokes 20a, 20b and, thereby improving the weight efficiency and aerodynamic performance of the hub retention member 12.

Figure 6A:
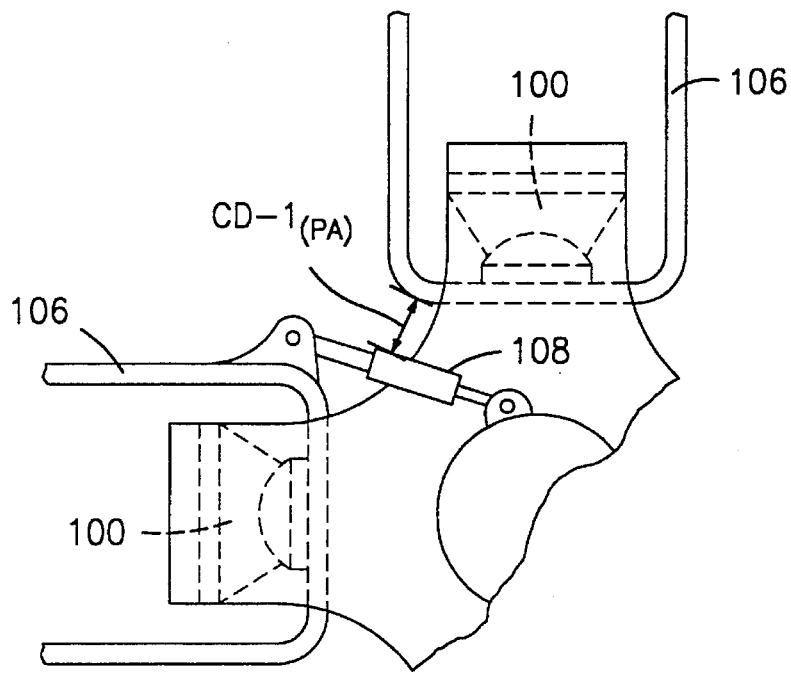
FIGS. 6a and 6b depict plan schematic views of a prior art articulated rotor hub assembly and an articulated rotor hub assembly employing the axisymmetric elastomeric bearing assembly of the present invention, respectively, for the purpose of comparing the clearance requirements between adjacent yokes and/or a yoke and intervening rotor blade damper.
Figure 6B:
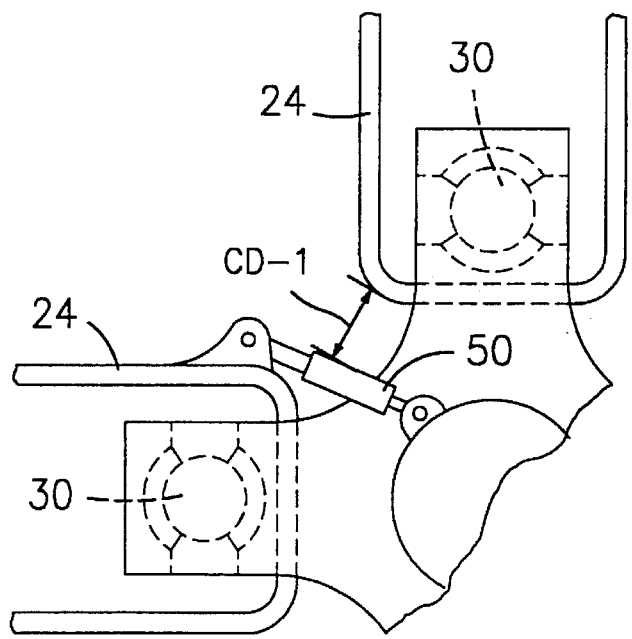

In FIGS. 6a and 6b, it will be appreciated that the enlarged envelop of the prior art elastomeric bearing 100 limits the available clearance $CD-1_{(PA)}$ between adjacent yokes 106 and/or between a yoke 106 and intervening rotor blade damper 108. Oftentimes these limitations force the rotor designer to reconfigure the rotor assembly yoke and hub retention member such that the yoke is oriented vertically to increase the available clearance. Such rotor hub configuration is shown and described in Hibyan et al. U.S. Pat. No. 4,568,245. As further discussed in the Background of the Invention, such enlarged clearance requirements and yoke orientation adversely impact the aerodynamic performance of the rotor hub assembly. The axisymmetric elastomeric bearing 30, on the other hand, provides greater clearance CD-1 between adjacent components e.g., between a rotor assembly yoke 24 and a rotor blade damper 50, thus, permitting the radial arms 24a, 24b of each rotor assembly yoke 24 to be oriented substantially horizontally with respect to the plane of the rotor system (i.e., within 10 degrees thereof to accommodate certain pre-pitch requirements). Such orientation reduces the profile area of the yoke 24 and, consequently, the aerodynamic drag penalties associated therewith.

Figure 7A:
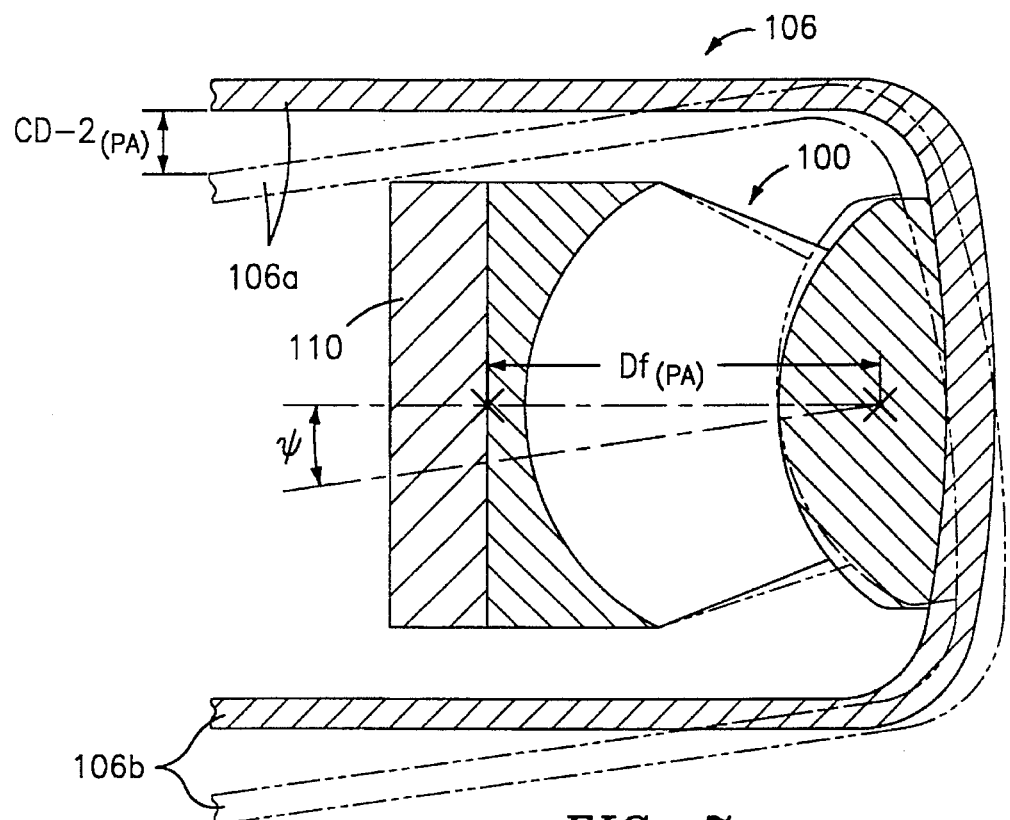
FIGS. 7a and 7b depict plan schematic views of a prior art elastomeric bearing and the axisymmetric elastomeric bearing assembly, respectively, for the purpose of comparing the clearance requirements between the rotor assembly yoke and the respective shear segment of each hub retention member.
Figure 7B:
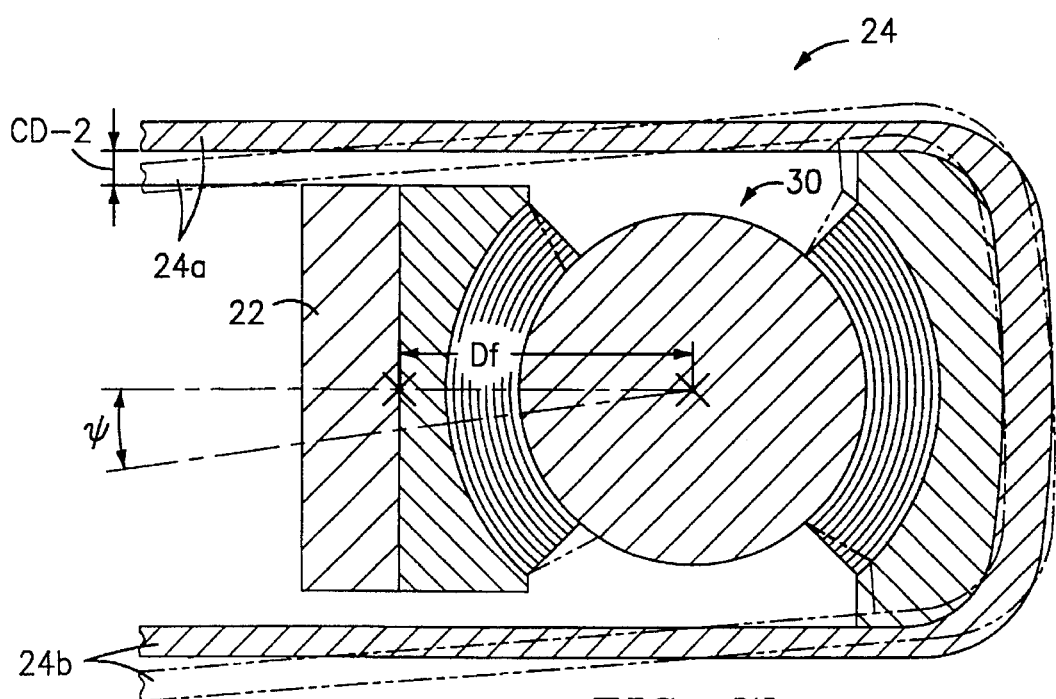

In FIGS. 7a and 7b, schematic plan views of the prior art and axisymmetric bearing assemblies 100, 30 are shown wherein the shear segments 110, 22 and rotor assembly yokes 106, 24 are sectioned along a horizontal plane. By examination thereof, it will be appreciated that the increased focal distance $Df_{(PA)}$ of the prior art bearing assembly 100 exacerbates the weight penalties by requiring increased clearance between the radial arms 106a, 106b and the shear segment 110 of the hub retention member 102. This can be seen by comparing the products $\psi^*Df_{(PA)}$ and $\psi^*Df$, which are indicative of the of the clearance dimensions $CD-2_{(PA)}$ and CD-2, respectively, required by the prior art elastomeric bearing 100 and the axisymmetric elastomeric bearing 30 of the present invention. The angle θ in these expressions is the maximum anticipated angular motion, i.e., flapwise or lead-lag motion of the rotor blade assembly. It will be apparent therefrom that a smaller focal distance Df produced by the axisymmetric elastomeric bearing assembly 30 reduces the requisite clearance between the yoke 24 and shear segment 22.

Figure 8:
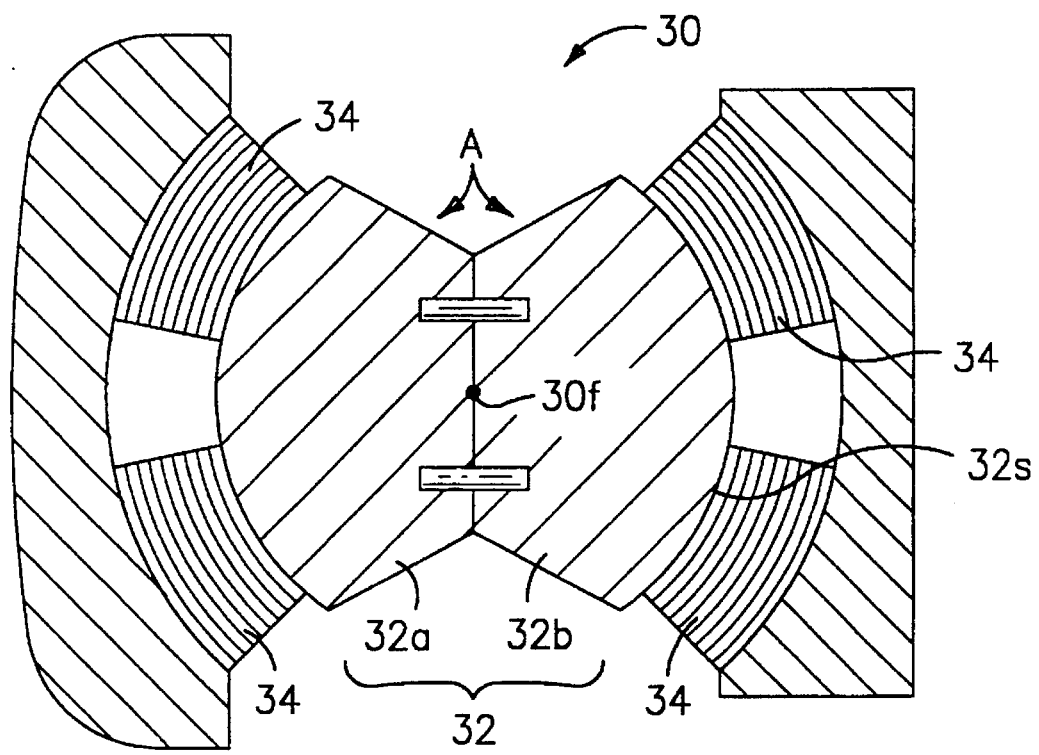
FIG. 8 depicts alternate embodiments of the axisymmetric elastomeric bearing assembly of the present invention.

While the present invention depicts a pair of spherical elastomeric elements 34, it will be appreciated that the spherical elastomeric elements 34 may be segmented into multiple pairs (see FIG. 8) provided, however, that the transverse and flapwise stiffness $K_T$ and $K_F$ thereof is sufficient to prevent buckling instability. Furthermore, while the present invention depicts a unitary central bearing element, it will be appreciated that the central bearing element may comprise multiple elements 32a, 32b which, when assembled, produce a spherical surface 32s for bonding the spherical elastomeric elements 34. The spherical surface 32s need not form an uninterrupted sphere, as illustrated, but may be machined or notched in unaffected areas A to lighten the bearing element 32 or to facilitate manufacturing processes. Furthermore, while the focal point 30f of the axisymmetric elastomeric bearing assembly 30 is preferably coincident with the flap, lead-lag and pitch axes Fa, La, of Pa of the rotor blade assembly 14, it will be understood that such positioning is non-essential. That is, while pure rotational motion is desirable to prevent cross-couplings between axes, the axisymmetric elastomeric bearing assembly 30 is capable of accommodating rotor blade articulation irrespective a requirement to offset the bearing focal point 30f from one or more axes Fa, La, Pa.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. An axisymmetric elastomeric bearing assembly (30) for an articulated rotor hub assembly (10) having a yoke (24) and a driving hub retention member (12), said axisymmetric elastomeric bearing assembly (30), furthermore, for use in combination with said yoke (24) and hub retention member (12) and operative for accommodating multidirectional displacement of a rotor blade assembly (14) of the rotor hub assembly (10), said axisymmetric elastomeric bearing assembly (30) being characterized by:

a central bearing element (32) having a spherical bearing surface (32s) defining a bearing focal point (30f);

spherical elastomeric elements (34) bonded to said spherical bearing surface (32s) on opposing sides of said bearing focal point (30f), each of said spherical elastomeric elements (34) having a plurality of alternating layers of elastomer and nonresilient shims (36, 38), said elastomer and nonresilient shims having a center of curvature $C_c$ which is coincident with said bearing focal point (30f) and disposed at increasing radii therefrom; and a bearing endplate (40) bonded to each of said spherical elastomeric elements (34), said bearing endplates (40) for use in combination with said yoke (24) and hub retention member (12);

said spherical elastomeric elements (34) defining a centerline $C_L$ which extends through the center of each spherical elastomeric element (34) and intersects said bearing focal point (30f);

said elastomer layers (36) of said spherical elastomeric elements (34) defining innermost and outermost elastomer layers (36i, 36o), having a compressive strength allowable $\delta_{Allow}$, and being operative to react centrifugal loads $C_f$ of said rotor blade assembly (14);

said innermost and outermost elastomer layers (36i, 36o) of said spherical elastomeric elements (34) having free edges and defining inner and outer radius dimensions Ri and Ro, respectively, measured from said bearing focal point (30f);

said free edge of said innermost elastomer layer (36i) and said bearing focal point (30f) defining a first line L1, said first line L1 forming an angle β with respect to said centerline $C_L$;

said free edges of said innermost and outermost elastomer layers (36i, 36o) defining a second line L2, said second line L2 forming an angle $\alpha$ with respect to a line $C_{PL}$ parallel to said centerline $C_L$;

said angle $\beta$ being between about 65 degrees to about 85 degrees;

said angle $\alpha$ being between about 35 degrees to about 55 degrees; and said inner radius dimension Ri being greater than or equal to $$\sqrt{Cf/\pi \sin\beta^2 \delta_{Allow}} \; ;$$

whereby said central bearing element (32) is rotationally self-positioning to effect load and motion sharing between said spherical elastomeric elements (34).

2. The axisymmetric elastomeric bearing assembly (30) according to claim 1 wherein said angle $\beta$ is between about 70 degrees to about 80 degrees; and wherein said angle $\alpha$ is between about 40 degrees to about 50 degrees.

3. A rotor hub assembly (10) for driving a plurality of rotor blade assemblies (14) including:

a hub retention member (12) having a plurality of radial spokes (20) and shear segments (22) for structurally interconnecting pairs of radial spokes (20); and a rotor assembly yoke (24) circumscribing each of said shear segments (22), said yoke (24) including a midsection (24m) and a pair of radial arms (24a, 24b) which project outwardly of said midsection (24m), said radial arms (24a, 24b) mounted in combination with one of said rotor blade assemblies (14);

wherein said rotor hub assembly (10) is characterized by:

an axisymmetric elastomeric bearing assembly (30) mounted between each said yoke (24) and a respective shear segment (22); said axisymmetric elastomeric bearing assembly (30) including:

a central bearing element (32) having a spherical bearing surface (32s) defining a bearing focal point (30f);

spherical elastomeric elements (34) bonded to said spherical bearing surface (32s) on opposing sides of said bearing focal point (30f); each of said spherical elastomeric elements (34) having a plurality of alternating layers of elastomer and nonresilient shims (36, 38), said elastomer and nonresilient shims (36, 38) having a center of curvature $C_c$ which is coincident with said bearing focal point (30f) and disposed at increasing radii therefrom; and a bearing endplate (40) bonded to each of said spherical elastomeric elements (34), said bearing endplates (40) mounted in combination with said midsection (24m) of said rotor assembly yoke (24) and said respective shear segment (22);

whereby said central bearing element (32) is rotationally self-positioning to effect load and motion sharing between said spherical elastomeric elements (34).

4. The rotor hub assembly (10) according to claim 3 wherein said radial arms (24a, 24b) of said yoke (24) are oriented substantially horizontally.

5. The rotor hub assembly (10) according to claim 3 wherein said elastomer layers (36) of said spherical elastomeric elements (34) define innermost and outermost elastomer layers (36i, 36o) have a compressive strength allowable $\delta_{Allow}$, and are operative to react centrifugal loads $C_f$ of said rotor blade assembly (14);

wherein said spherical elastomeric elements (34) define a centerline $C_L$ which extends through the center of each spherical elastomeric element (34) and intersects said bearing focal point (30f);

wherein said innermost and outermost elastomer layers (36i, 36o) of said spherical elastomeric elements (34) have free edges and define inner and outer radius dimensions Ri and Ro, respectively, measured from said bearing focal point (30f);

wherein said free edge of said innermost elastomer layer (36i) and said bearing focal point (30f) defines a first line L1, said first line L1 forming an angle $\beta$ with respect to said centerline $C_L$; and wherein said free edges of said innermost and outermost elastomer layers (36i, 36o) define a second line L2, said second line L2 forming an angle $\alpha$ with respect to a line $C_{PL}$ parallel to said centerline $C_L$;

said angle $\beta$ being between about 65 degrees to about 85 degrees;

said angle $\alpha$ being between about 35 degrees to about 55 degrees; and said inner radius dimension Ri being greater than or equal to $\sqrt{Cf/\pi \sin \beta^2 \delta_{Allow}}$.

6. The rotor hub assembly (10) according to claim 5 wherein said angle $\beta$ is between about 70 degrees to about 80 degrees; and wherein said angle $\alpha$ is between about 40 degrees to about 50 degrees.

\* \* \* \* \*